United States Patent [19]

McCullough

[11] Patent Number: 5,059,019

[45] Date of Patent: Oct. 22, 1991

[54] LASER FRAMEFINDER

[76] Inventor: Greg R. McCullough, 1113 Poinsettia Dr., West Hollywood, Calif. 90046

[21] Appl. No.: 526,287

[22] Filed: May 21, 1990

[51] Int. Cl.$^5$ .............................................. G03B 29/00
[52] U.S. Cl. .................................... 352/131; 352/171; 352/4; 352/3; 352/48
[58] Field of Search ................... 352/170, 171, 131, 4, 352/172, 208, 89, 3, 48

[56] References Cited

U.S. PATENT DOCUMENTS

| | | | |
|---|---|---|---|
| 2,816,475 | 12/1957 | Waller et al. | 352/48 |
| 4,516,159 | 5/1985 | Diepeveen | 358/293 |
| 4,714,321 | 12/1987 | Sillitto | 350/174 |
| 4,837,633 | 6/1989 | Parra | 358/224 |

*Primary Examiner*—Monroe H. Hayes

[57] ABSTRACT

The element of the laser framefinder comprise a laser beam generator, a shutter for pulsing a beam of laser light, a laser beam scanner, coupling elements joining a laser beam generator with a laser beam scanner, elements for manipulating a scanning device to produce a laser light pattern, a camera including elements for coupling a scanning device to a camera body, projecting device for aligning a laser light pattern with an optical axis of a camera, a device for optically transmitting a laser light pattern from the scanner to one projecting device, elements creating optical transparency to laser light in a substantially planar ground glass element used as the focusing element of a reflex viewing system, a feedback network utilizing a sensing element to couple laser beam pulsation with a positioning of an optical element of a scanning device, a feedback network utilizing a sensing device to couple a laser beam pulsation with a positioning of a projecting apparatus.

31 Claims, 8 Drawing Sheets

LASER FRAMEFINDER

BACKGROUND

1. Field of the Invention

This invention relates to optical image projection devices for superimpositionally projecting a scanned light beam, such as a laser beam, upon photographic subject matter within the field of view of a camera. More particularly to indicate a field of view of a camera or some portion of that field of view such as an optical frame that a photographer has chosen.

2. Discussion of Prior Art

It is known to use a variety of media to record a photographed image, such as:
 a photographic emulsion upon a film base sensitive to visible radiation of the electro-magnetic spectrum,
 a photographic film photosensitive to invisible radiation of the electromagnetic spectrum,
 a photographic negative image film,
 a photographic positive image film,
 a tape media employing ferro-magnetic means of recording electronic impulses,
 a solid disc media employing a laser beam means of recording digital electronic impulses,
 aforementioned media with capabilities of recording gradations of gray, and
 aforementioned media with capabilities of recording hues of color.

It is known to use a variety of dimensional and material formats in the manufacture of image recording media, such as:
 a dimensional width of a photographic film,
 a thickness of a photosensitive emulsion applied to film media,
 a size of a perforation punched into a film,
 a number of perforations per inch punched into a film,
 an amount of ferro-magnetic material applied to a tape media,
 a photosensitivity of a photographic film,
 a grain quality of a photographic film emulsion commonly ascertained by the quantitative value of a crystalline chemical material within the emulsion, and
 a laser-disc media.

It is known to use a variety of physical components to build a recording camera, such as:
 a lens system with variable focal length,
 a lens system of specific focal length,
 a shutter system,
 an iris,
 a pressure plate,
 an aperture gate,
 a viewing system,
 a film advance mechanism,
 a film rewinding mechanism,
 a camera body,
 a flash lighting system, and
 a hard matte.

It is known that the variables concerning photographic recording media, a camera's physical hardware components, and camera accessories combine to produce a recorded image of specific aspect ratio and constant area size commonly referred to as the full aperture image.

It is known in motion picture photography and still frame photography that a full aperture image is an image recorded on photographic film without the use of any delimiters, such as a hard matte. The size of a full aperture image is commonly determined by the physical dimensions of an apertured plate. For instance, a camera with an aperture size of 0.976"×0.437" will record a full aperture frame image that is 0.976"×0.437" on the film emulsion.

It is known that video recording technology incorporates the use of electronic sensors to translate light ray bundles into electronic impulses which can then be stored on video recording media such as ferro-magnetic tape. The image size of a video recording is usually limited by the physical arrangement of the sensor array and the light gathering capacity of the camera's optics. Video images remain flexible in dimensional size even after recorded upon a media because of the ease of manipulating electronic impulses. However, for the purpose of explaining the invention the term "full aperture image" shall apply to the image striking the photosensors of the video camera. This term shall apply similarly to alternate forms of photography that do not employ a photographic film emulsion for recording.

The term "full aperture image" is applied to a recorded photographic image of an object and is used to define the maximum possible area size of an image produced by any specific camera hardware configuration.

In film photography the process of generating a replication of a full aperture image is commonly referred to as printing. An optically printed replication of the full aperture image is often referred to as a photographic print. In motion picture photography the final photographic print, commonly called the answer print, passes through several intermediate stages of printing commonly called; a work print, a rush print, a trial composite, an interpositive, or an optical print. These prints are used by various individuals for various purposes. A film editor utilizes a work print for initial trial editing purposes. A rush print is used principally for viewing purposes to ascertain mistakes in the various elements of photography. A trial composite is used to balance color throughout the film. An interpositive is utilized to create duplicates. An optical print is utilized to add special effects photography. In still photography the photographic print can exist in various forms as it may be printed on a variety of media, such as a photographic print paper or a transparent media.

It is known that a photographic print can vary radically from the full aperture image from which it was generated. Many variables can affect the photographic print during optical printing, such as:
 a color of the image,
 a dimension of the image,
 a width to height aspect ratio of the image,
 a subject matter included in the photographic print,
 a subject matter added during optical printing,
 a subject matter masked during optical printing,
 a subject matter deleted during optical printing,
 a subject matter excluded from optical printing,
 a light intensity of the photographic print, and
 a light intensity of a part of a photographic print.

It is known that processes applied during the course of printing can affect the resulting photographic print, among these are:
 superimposition,
 beam splitting image convergence, and
 matting.

Additionally photographic images are commonly transferred to magnetic media for purposes that include:
a chyron effect,
a chroma key effect,
a paint box effect,
a frame expansion,
a color change,
an editing choice, and
a duplication.

During transfers between recording mediums the optical frame can shift slightly due to accidental misalignment or due to deliberate manipulation.

The term "photographic print" is applied to a complete or partial replication of a full aperture image and is used to define any possible duplication, partial or complete, of a full aperture image.

The perimeter of the area containing the photographic print is commonly referred to as an optical frame. A photographic print may be an exact duplicate of the full aperture image or it may be a partial replication of the full aperture image.

The term "optical frame" is applied to a recorded photographic image and is used to define the perimeter of an area containing a photographic print of a full aperture image.

An optical frame containing a photographic print is commonly rectilinear in form and referred to by the dimensional aspect ratio of its width to height. In motion picture photography the theatrical presentation of a film can be projected utilizing a variety of aspect ratio formats. Typical aspect ratios utilized in 35 mm film theatrical presentation are: 1.37:1, 1.66:1, 1.75:1, 1.85:1, and 2.4:1. Typical aspect ratios utilized in 70 mm theatrical presentation are: 2.2:1, and 2.4:1. A typical aspect ratio utilized in television broadcast is 1.33:1; however, a television broadcast format is not truly rectilinear having rounded corners.

It is known that a number of different presentational formats exist, such as:
a television broadcast,
a screen projection,
a wide screen projection,
a 35 mm projection,
a 70 mm projection,
a vistavision theatrical presentation,
an omni-max theatrical presentation,
an Imax theatrical presentation (Image maximization),
a 35 mm anamorphic squeezed projection, and
a 35 mm anamorphic non-squeezed projection.

Each of these presentational formats may be considered by photographers, key film technicians, and production personnel during photography. Consultations and discussions among them concerning appropriate framing often result.

When a photographic image is presented via a number of differing presentational formats, the optical frame may undergo substantial changes in terms of a width to height dimensional aspect ratio; consequently, in the motion picture industry it is commonplace for key members of the film crew to discuss the multiple optical frames of a single full aperture image that may undergo theatrical or broadcast presentation. The numerous permutations of possible optical frames compounds the difficulty of communication concerning an optical frame or the subject matter contained within it.

A cinematic director of photography may refer to the 1.33:1 aspect ratio television broadcast optical frame when relating concerns about the positioning of the microphone to the sound recording engineer; however, he may simultaneously instruct a camera operator to frame the action using the 1.85:1 aspect ratio of a common motion picture optical frame, then assure a producer that certain subject matter elements are being recorded in motion picture full aperture frame image even though they are not included in the 1.85:1 optical frame.

In still frame photography the photographic print can also be very different in size from the full aperture image and can include only a portion of the image recorded on film. Still frame photographers commonly call this process cropping the image. This cropped image represents an optical frame within the recorded image. This optical frame is often difficult to communicate since it is not represented in the viewfinder of the camera. Photographers typically will point to the subject matter or indicate by verbally describing where an optical frame falls within the subject matter. Sometimes, during fine adjustments, it is even necessary for the photographer to walk from the camera to the subject matter so as to physically indicate a boundary of an optical frame he has envisioned.

The difficulty of communication concerning an optical frame is also compounded by the sheer number of individuals concerned with it, for instance:

A 1st assistant cameraman is responsible for altering the focus of the lens to follow the action being photographed. Oftentimes the follow focus occurs as an actor or an object enters a scene. Without knowing the precise boundary of the optical frame being considered, a critical moment in the action may be left out of focus. The same considerations extend to the manipulation of the focal length of a lens, commonly called zooming.

A gaffer concerned with lighting cues is dependent on knowing whether the action that motivates the lighting cues is in frame. He may also be concerned with the physical placement of a lighting instrument encroaching on an optical frame.

Costumers, set dressers, make-up artists, hair stylists, and stand-by painters, are examples of technicians concerned with the subject matter being photographed. Commonly these individuals have no reference display that indicates the optical frame and, consequently, they are not aware sometimes that the subject matter of their concern is being photographed.

Aside from the technical crew, there exist a number of individuals without direct responsibilities o the shooting set; yet, these individuals are concerned with the photographic framing. Many of these individuals are involved in post-production work such as editing, special optical effects, composite matte photography, or animation overlay cels. Oftentimes, they visit the shooting set to ascertain specific information that may help them prepare for their work. To obtain that information they often must address the photographer or reference the reflex viewing system of the camera, a time consuming distraction for a busy photographer.

Actors are constantly wondering whether they are in frame. Thousands of shots have been ruined by an actor inadvertently drifting out of frame. Occasionally, a close-up shot of some small action requires a precision of movement within an optical frame; however, without a reference guide, trial and error experiments are the normal procedure.

Thus, the general problem that this invention addresses is the long felt need for a device that would enable a film worker to discern an optical frame by direct visual reference, thus facilitating communication regarding an optical frame and the subject matter contained within its border.

Heretofore, viewing systems have been employed to facilitate communication between a photographer and other film workers. A viewing system allows a photographer to reveal the image he intends to record to others; however, to do so he must remove his eye from the eyepiece to allow others to look into the eyepiece. Two types of viewing systems are commonly used for this purpose: a reflex viewing system and a non-reflex viewing system.

A non-reflex viewing system commonly utilizes a secondary lens system. It is aligned parallel to, but separated from a camera's optical axis. The consequent parallax effect produces a viewing image that will differ slightly from the image that will be recorded.

A reflex viewing system utilizes reflective optical elements to transmit a photographic image directly to an eyepiece. A reflex system's optics are precisely aligned with the camera's optical axis; consequently, the image seen by a viewer looking into the eyepiece is identical to the image that will be recorded by the camera.

A ground focusing glass is a removable optical element of the reflex viewing system. It is located along the optical axis of the reflex viewing path at the focal plane of the camera lens. A ground glass is commonly demarcated with lines or etchings that correspond to optical frames of specific aspect ratio. Ground glass plates are available with a wide variety of indicated optical frames and can be interchangeably mounted within the camera. These framing reference lines help a camera operator to align specific subject matter within the demarcated optical frame; however, to discern the optical frame via ground glass demarcations a photographer must be looking through the reflex system of the camera. If a photographer looks directly at photographic subject matter he has no reference frame to guide him. Furthermore, should a photographer wish to communicate the exact optical frame he is considering he must allow another individual to look through the viewing system of the camera.

Video cameras can be integrated with the reflex viewing system of photographic cameras to produce an image on a remote monitor. Coaxially aligning the video camera with the photographic image is commonly accomplished by means of a beamsplitter. A beam splitter is an optical element that replicates an image by partial reflection. The replicated image is diverted to the video viewing system's electronic sensors. The sensors convert the optical image into electronic information which is sent to a remote monitor. At the monitor the information is converted into a video image which can be viewed without having to reference the eyepiece of the camera.

Video viewing systems offer two advantages over reflex viewing systems. The photographer is freed from the burden of sharing the reflex viewing system with others and video monitors allow multiple simultaneous viewers; however, the advantages of video viewing systems have to be balanced with the disadvantages of a video monitor's picture. The lighting is distorted, imaging perspective is severely reduced, and the image presented to the viewer is a two dimensional representation of three dimensional subject matter.

The hardware employed by video viewing systems imposes additional limitations. Oftentimes, because of the physical bulk of a monitor, the monitor is located in a remote area, reducing the photographer's ability to communicate with those observing the monitor. Video monitors often need cabling systems connecting them physically to a video tap which is connected to a camera. Monitor cables are unwieldy, bulky, entangling and often awkwardly restrict camera movements or the movements of a camera operator.

A further disadvantage of a video viewing system is that one cannot view a monitor and simultaneously view directly the subject matter being photographed.

SUMMARY OF THE INVENTION

Accordingly, the foregoing problems and difficulties are obviated by the present invention which provides for a novel apparatus capable of producing a projected image of a scanned laser light pattern within the field of view of a camera so that an optical frame may be visually perceived without reference to the viewing system of the camera.

According to one aspect of the invention, there is provided a laser beam generator having an optical cavity for producing a coherent beam of laser light that is coupled by optically transmissive means to a laser beam scanning device. Preferably, the optically transmissive means is a mechanical coupling which aligns the laser beam with an aperture hole in the coupling member, but a fiber-optic coupling technique utilizing a recollimating lens may be used. The scanning device contains optical elements positioned by mountings that are acted upon by manipulative means to form a pattern of laser light. Preferably the manipulative means are electro-mechanical; however, an opto-mechanical means, an oscillating fiber-optic means, a piezo-electric crystal oscillating means, a mechanical means, a chemical means utilizing chiral smetic structures, a superconductive means, or a ferro-magnetic means may be used.

The light scanning device is coupled by aligning means to the camera body. Preferably, the aligning means is mechanical; however, a magnetic means, a gyroscopic means, or an electro-mechanical means may be used. The pattern is aligned with transmissive optical means within the camera body. The transmissive optical means is preferably the optical components of the reflex viewing system of the camera; however, a separate optical pathway utilizing beamsplitting technology may be used. Beamsplitting optics such as beamsplitting cubes are available from Melles-Griot 1770 Kettering street Irvine, California 92714. Preferably, a substantially planar ground glass element optically transparent to laser light is utilized as the focusing element of the reflex viewing system. The optical means transmit the pattern to a projecting means that aligns the pattern with the optical axis of the camera and projects the pattern onto the subject matter being photographed. The preferred projecting means is a reflective optical element such as the reflective surface of the shutter mirror; however, a separate optical element may be employed.

Therefore, it is among the primary objects of the invention to provide a projection of scanned laser light within a camera's field of view, so as to visually indicate any optical frame chosen by a photographer.

It is another object of the invention to provide a reference frame that is three dimensional in form; in other words, a reference frame that exists in the same dimensional space as the subject matter being photographed.

It is a further object of the invention to provide a means of determining the subject matter included within an optical frame by direct visual reference.

It is a further object of the invention to provide a reference frame which can be manipulated in size and aspect ratio.

It is a further object of the invention to provide an alternate means of projecting a scanned pattern of laser light that is coincident with a camera's optical axis and within a camera's field of view, so as to visually indicate any optical frame chosen by a photographer.

It is a further object of the invention to provide a projection of scanned laser light to indicate any portion of an optical frame chosen by a photographer, including any point or set of points lying within an optical frame.

It is a further object of the invention to provide a cinematic director of photography a means of monitoring the operation of a camera by a camera operator.

It is a further object of the invention to provide a cinematic director a means of ascertaining the optical frame without removing his focus from the action being photographed.

It is a further object of the invention to provide a cinematic technician with means of ascertaining an optical frame without consulting the director of photography and without reference to the viewing optics of the camera.

It is a further object of the invention to provide a clear indication of the boundary of an optical frame allowing film workers to anticipate a subject moving into or exiting from the optical frame.

It is a further object of the invention to provide the photographer with the means to indicate specific items by using the laser beam as a pointer, enabling him to discuss problems that may be physically far removed or difficult to point out to an individual not viewing along the camera's optical axis. For instance, the application of dulling spray on a shiny object far removed from the camera.

It is a further object of the invention to provide an optical device that will indicate the central point of a camera's field of view that corresponds to the camera's optical axis.

It is a further object of the invention to provide a reference frame that can be perceived at great distance.

It is a further object of the invention to provide the dolly or crane operator with a simple method of coordinating the movements of the dolly or crane with the movements of the camera by simply watching the changing field of view of the camera.

It is a further object of the invention to provide an individual responsible for pyrotechnic special effects such as explosions or bullet hits a method of more effectively timing pyrotechnic effects so that they occur while within the optical frame.

It is a further object of the invention to provide actors with an optical means of recognizing the position of the optical frame so that they can enter or exit the frame on cue, avoid accidentally slipping out of the optical frame, and avoid moving so fast that the camera operator cannot follow the action.

It is a further object of the invention to provide a method of using a laser pattern to indicate matte images that are to be optically composited so that actors have a point of reference to play against and the correct eye-line to match the action of the final composite.

It is a further object of the invention to provide a pattern projection which corresponds to a matte being utilized in composite matte photography, so as to allow a relational base between the subject photographed and the image being composited.

It is a further object of the invention to provide a means of sychronizing the pulsation of the laser with the movement of the shutter mirror so that a laser pattern can be projected onto subject matter being photographically recorded without the laser pattern being recorded.

It is a further object of the invention to provide a means of allowing the technical crew to rehearse in precise coordination with the talent, models, moving objects or even puppets. The laser pattern obviates the need to verbally discuss the physical location of the optical frame; therefore, discussion of mistakes after a rehearsal will produce highly efficient corrective action, saving film as well as saving time, and will result in decreased costs.

It is a further object of the invention to provide an efficient means to establish the optical frame for individuals remote to the camera's viewing system.

It is a further object of the invention to provide an optical device that superimpositionally projects multiple patterns corresponding to optical frames of various aspect ratios upon photographic subject matter, so as to compare and evaluate the effects varying frames have upon photographic composition, technical elements, and dramatic impact.

Further objects and advantages are to provide an optical image projecting device which can be used easily and conveniently which can be used in conjunction with video viewing systems for photographic cameras, which can be used with a wide variety of film stock and photographic formats, which can be used with a variety of shutter speeds and film frame advance rates, which can be used with a wide variety of photographic still frame film cameras, motion picture cameras, video cameras, x-ray cameras, nuclear imaging cameras, microscopic cameras, telescopic cameras, and infra-red cameras.

According to a second aspect of the invention, there is provided a regulating means of pulsating the output of the laser beam generator. There is provided a sensing means for determining the position of the projecting means which in motion picture photography is preferably a rotating partially transmissive, partially reflective shutter mechanism. The sensing means acts as a feedback mechanism to a series of electronic logic gates which synchronize the pulsation of the output of a laser beam generator with specific physical positionings of the shutter mirror. The advantage of this embodiment is that laser light is directed through the reflex viewing system only when the reflective portion of the shutter mechanism is in a position to project it through the objective of the camera.

According to a third aspect of the invention, there is provided a regulating means of pulsating the output of the laser beam generator. There is also provided a sensing means for determining the position of an optical element of a laser beam scanning device which is preferably a rotating prism, but may be any permutation of a galvanometric and resonant low inertial scanning mechanism, such as: a two coordinate oscillating mirror mechanism, a mirror mounted in a hemispherical holder having ferro-magnetic sides and controlled by electro-magnetic means, or piezo-electric crystal controlled oscillating mirror mechanism. The sensing means acts as a feedback mechanism to a regulating means of pulsating the output of the laser beam generator, so as to provide a synchronizing means for coordinating the pulsation of laser light with specific physical positionings of the optical elements of the scanner. The advantages of this embodiment lie principally in the patterns of light capable of being scanned. Intermittent pulsation coupled with precise positionings of the scanner's optical elements produce very complex patterns that can be precisely repeated hundreds of times per second: much faster than human persistence of vision.

According to a fourth aspect of the invention, there is provided means of combining the second aspect with the third aspect of the invention. The sensing means acts as a feedback mechanism to a series of logic gates which synchronize both the position of the shutter mirror with the specific physical positioning of the optical elements of the scanner. In this embodiment of the invention a more complex combination of logic circuits can time light pulses to form specific patterns of light while insuring that the generated pattern is only directed through the lens of the camera and onto the subject matter being recorded.

It is known that the refractive index of an optical material is determined by its variance from a reference material. Furthermore, the angle of refraction of a beam of light passing through an optical material is dependent upon the wavelength of light comprising the beam; consequently, the effect a lens system has upon an image comprised of various wavelengths of light, may differ from the effect a lens system has upon a laser beam pattern of specific wavelength.

According to a fifth aspect of the invention, there is provided an optical means of altering the refractive effects a lens system has upon the specific wavelength of laser light employed in the projection of a laser light pattern, thereby causing a corresponding reduction or enlargement in the size of the pattern.

It is known that certain optical lenses spread a beam of light into a line. These lenses are called line generating lenses. They can be acquired from:

Aerotech Industries
101 Zeta Dr.
Pittsburg, Pa.
15238

According to a sixth aspect of the invention, there is provided a line generating lens coupled to an apertured mounting member, so as to permit the passing of a beam of laser light through the lens and through the aperture hole of the mounting member. A rotary means applied to the apertured mounting member produces a projection of a conical pattern of laser light. A masking means of quadrilaterally sectioning the conical pattern produces a rectilinear pattern corresponding in aspect ratio to an optical frame.

According to a seventh aspect of the invention, there is provided a masking means of generating a pattern of laser light through liquid crystal material. The masking means is preferably a thermal method of creating optical transparency in an opaque chiral smectic structure of free standing liquid crystal by cholesteric-isotropic phase transition. A beam of laser light scanned across the area containing the chiral smectic structure passes through the thermally activated areas projecting a pattern of laser light that corresponds to the pattern of thermal activity. The thermal activity can be induced by infra-red radiation or by electrical resistance.

According to an eighth aspect of the invention, the invention as previously described is coupled to a computer capable of digitizing, storing and recalling a video image extracted from the reflex system of a motion picture camera by a video camera. The digitized information is fed to a low inertial scanning device capable of scanning complex patterns. The scanner replicates the image and projects it onto the scene being photographed. This virtually simultaneous superimposition of a projection of the scanned image of the subject matter upon the subject matter is then photographed creating a special photographic effect. A person dancing on a stage could have a perfect outline of their figure projected upon them while they were moving. By inserting electronic flip-flop circuitry into the process, time-delays affecting the time relationship of the subject matter's action to the projection of that action can be experimented with, producing exotic special effects such as a blurred delayed action superimposed upon the "real-time" action. Much of the work in special effects that is done through composite photography could be done right in the camera. Also, set pieces could be combined with light projections of stored digitized images to complete the scenery. The disadvantage of this embodiment is the necessity to alter the shutter arrangement of the conventional motion picture camera or put up with the problems associated with parallax when projecting from a scanner using an optical axis other than the camera's. The alignment of matte photography would be greatly facilitated by this invention which could project a digitized stored image of the original photography upon the matte for alignment of the matte image with the original photography or vice versa.

Animation, which is currently undergoing a great revival with such pictures as "Roger Rabbit" that combine complicated animation with complicated photography, would greatly benefit from the assistance this invention would give in aligning imagined images with real ones.

Multiple camera format photography requires alignment of a frame edge of one camera with a frame edge of a successive camera. These multiple camera photographic formats could utilize the invention to facilitate alignment.

DESCRIPTION OF THE PREFERRED EMBODIMENT

Figure 1:
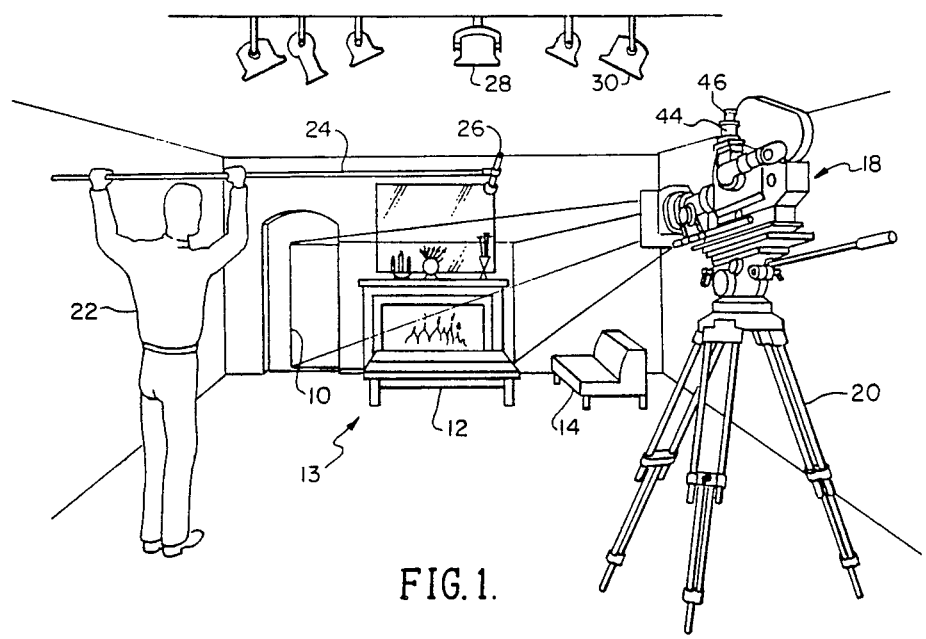
FIG. 1 is a perspective drawing of a laser beam pattern projected from a camera onto the subject matter of a photographic recording.

In FIG. 1, a laser beam pattern 10 is projected onto and about subject matter 13 intended to be photographically recorded by a camera 18 on a tripod 20. Filming activities surround the filming set such as a soundman 22 with microphone 26 on the end of a boom pole 24. Lighting is represented by numerals 28 and 30, for example. Although a rectangular pattern 10 is shown, other patterns may be employed and visually displayed about the subject matter 13 so as to indicate a field of view of camera 18. A portion of table 12 is shown included within pattern 10 indicating that it will be photographed. Sofa 14 is illustrated outside the area demarcated by pattern 10; consequently, sofa 14 will not be photographed. Pattern 10 is generated by laser emitter 46 and light scanner 44 coupled to the optics of camera 18. Images of the subject matter are recorded on a suitable medium such as photographic still film, moving picture film, magnetic tape, laser disc media or the like within the image recording apparatus 18.

Figure 2:
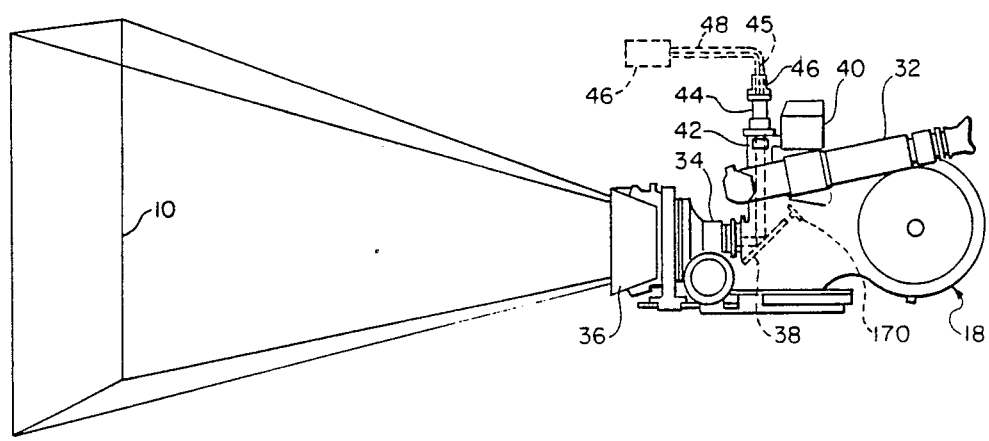
FIG. 2 is an elevation drawing of a photographic apparatus for indicating an area to be photographed operating in conjunction with: a video camera mounted upon a motion picture camera.
Figure 14:
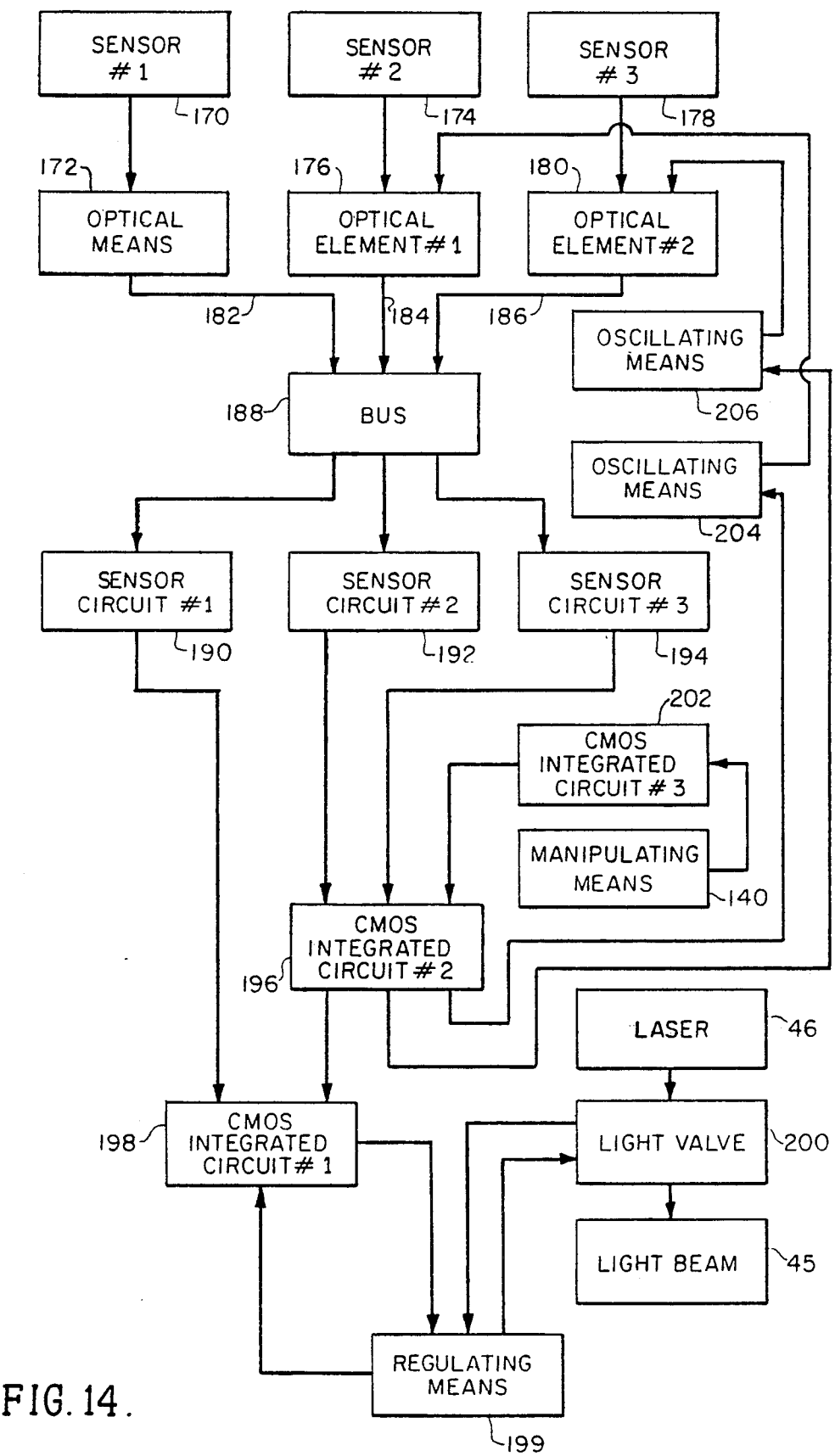
FIG. 14 is a flowchart describing the interacting elements of an electronic feedback network utilized to synchronize a pulsation of the laser emitter with moving optical elements.

FIG. 2 shows a motion picture camera 18 projecting a light pattern 10 from within matte box 36. The light beam 45 is generated from a laser emitter 46, which is shown in two embodiments: local and remote. The remote embodiment (illustrated by dotted lines) utilizes fiber-optic cable 48 to transmit light beam 45 from laser emitter 46 to light scanner 44. In the local embodiment (illustrated with solid lines) the laser emitter 46 is attached directly to the scanner 44. The scanner 44 converts the laser beam 45 into a pattern 10 which is transmitted into the camera's reflex viewing system 32 via beamsplitting cube 42. The reflex viewing optical pathway 32 transmits the pattern 10 to the shutter mirror 38 where it is aligned with the optical axis of the camera's objective 34 and projected through objective 34 which optically influences the overall size of pattern 10. The camera 18 is shown being used in conjunction with a video camera 40 that utilizes the camera's reflex viewing optical pathway 32 to record an image (not shown). Beam splitting cube 42 allows scanner 44 and video camera 40 simultaneous access to optical pathway 32. Shutter positional sensor 170 is illustrated proximate to shutter 38 and is also shown in FIG. 14 as part of an electronic feedback network servicing the synchronizing control unit of FIG. 14. Although a rectangular pattern 10 is illustrated, other patterns may be employed and visually displayed about the photographic subject matter.

Figure 3:
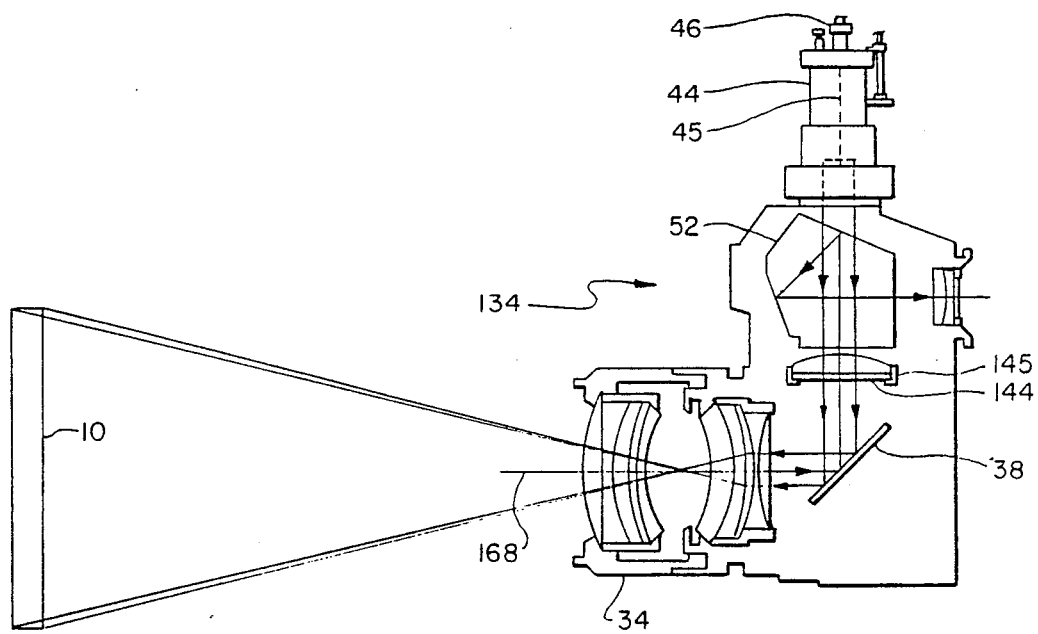
FIG. 3 is a schematic drawing of a cross-sectional view of a pattern generator co-axially aligned with the optical axis of a still photographic film camera.

FIG. 3 shows a laser beam emitter 46 mounted to a scanner 44 which is mounted to a still frame camera 134.

A laser beam 45 is emitted from laser emitter 46 to scanner 44 which generates a pattern 10. Laser pattern 10 is transmitted through pentaprism 52 and through ground glass 144 and ground glass holder 145 to reflex mirror 38 which projects pattern 10 through camera objective 34. Objective 34 is shown optically magnifying the size of pattern 10. In this embodiment ground glass 144 is a substantially planar member that is transparent to laser light. Pattern 10 is aligned coaxially with optical axis 168 of camera objective 34. Although a rectangular pattern 10 is illustrated, other patterns may be employed and visually displayed about the photographic subject matter.

Figure 4:
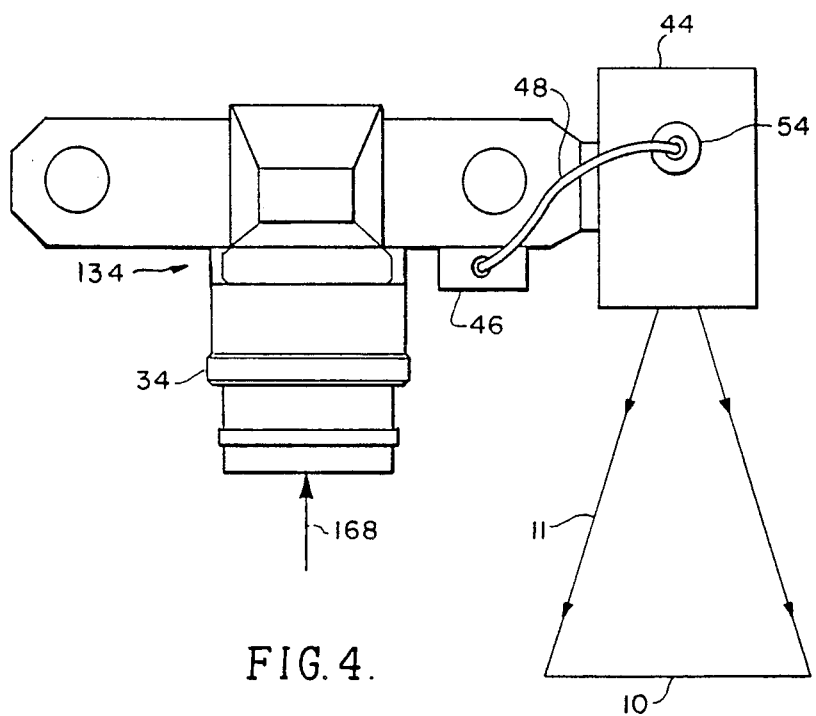
FIG. 4 is a plan view of the invention generating a laser pattern along an optical axis separate from the optical axis of a still photographic film camera.

FIG. 4 shows a plan view of a scanner 44 attached to a still film camera body 134. Laser emitter 46 is coupled to scanner 44 by fiber-optic cable 48 and connector 54. Pattern 10 is generated by scanner 44 and projected directly onto the subject matter being photographed. The reflex viewing optical pathway indicated by optical axis 168 is completely bypassed providing the advantage of ease of manufacture and assembly; however, alignment of pattern 10 with the camera's field of view (not shown) is not as precise as the embodiment shown in FIG. 3. In FIG. 4 pattern 10 is affected by keystoning due to parallax.

Figure 5:
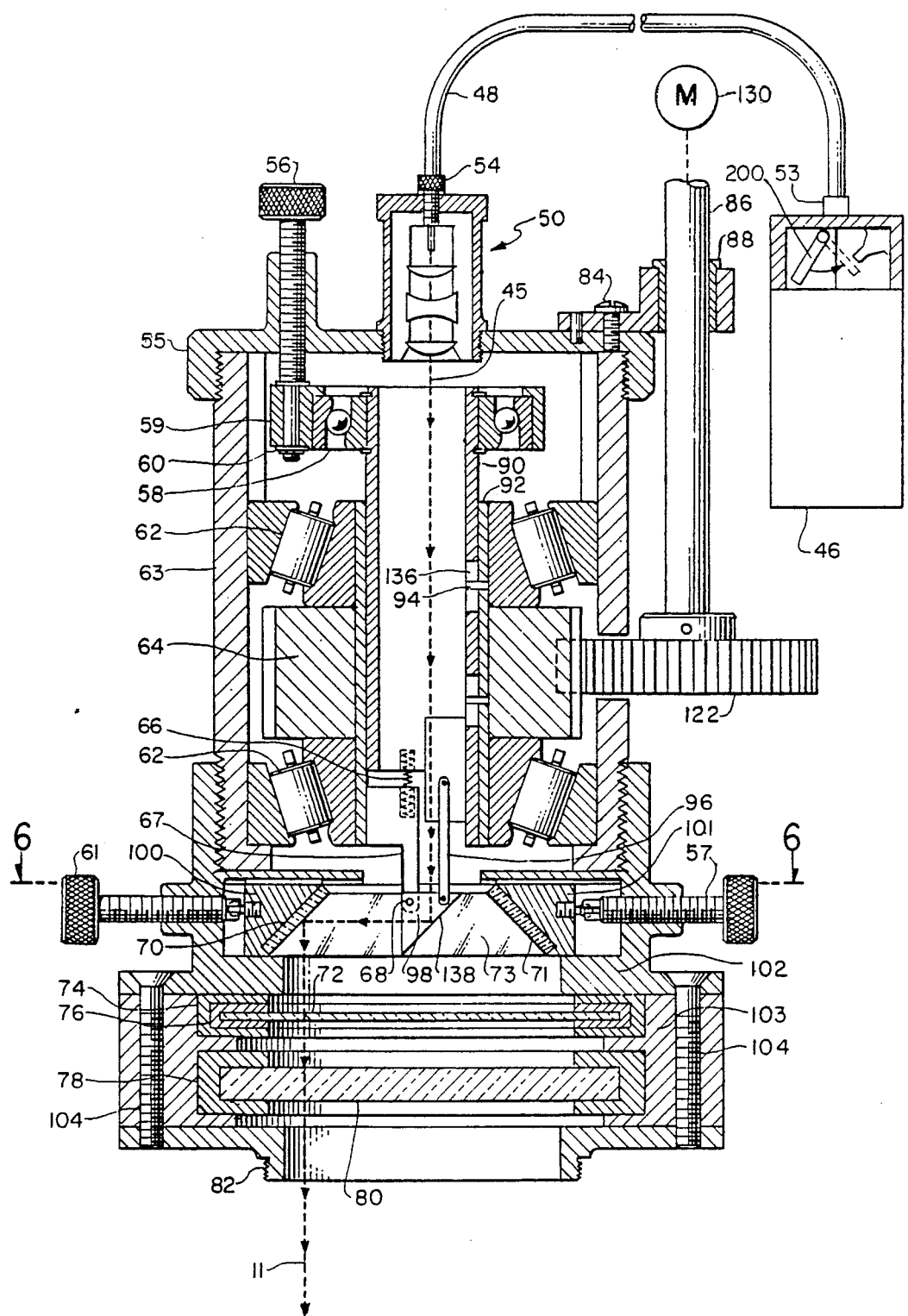
FIG. 5 is an elevation drawing showing a cross-section of an elevation view of a laser beam scanning device.

FIG. 5 shows a crossection of one embodiment of a scanning mechanism (shown in FIG. 2) utilized to convert a beam 45 into a pattern 10 shown in FIG. 1. In this embodiment a remote laser emitter 46 generates a laser beam 45 which passes through light valve 200 which is an electro-magnetically operated shutter mechanism and beam 45 is transmitted from connector 53 by fiber-optic cable 48 through connector 54 to collimating lens assembly 50. Recollimated beam 45 passes through coaxially mounted cylinders 90 and 92 to rotating right angle prism 98 which reflects beam 45 to mirror 70. The 360 degree rotation of prism 98 scans a line (not shown) along the surface of mirror 70, mirror 73, mirror 71, and mirror 69 (shown in FIG. 6) generating pattern 10 of FIG. 1. Mirrors 70, 73, 71, and 69 reflect pattern 10 through matte 72 and through polarizing filter 80 and out of the scanning mechanism through an aperture hole machined in coupling member 82.

The structural support housing of the scanning mechanism consists of: an enclosing member 55, a main cylindrical support member 63, a mirror housing 102, filter holder 103 and apertured coupling member 82. Cylinder 63, which is threaded at both ends interfaces with the threaded aperture of mirror housing 102. Housing 102 is rectangularly shaped with a flanged bottom member designed to affix filter holder 103 and coupling member 82 by threaded screws 104. Coupling member 82 has a threaded cylindrical protrusion which provides a method of fastening scanner 44 to camera 18 (shown in FIG. 1). Threaded enclosing member 55 interfaces with threaded support member 63 and has apertures associated with micrometer 56, collimating lens 50, and retaining screw 84.

The mechanical power to rotate prism 98 is provided by a motor 130 (shown in symbol form by an encircled letter M), which is connected to a drive shaft 86 which rotates drive gear 122. Gear 122 controllably transmits a rotational energy from the motor 130 to main gear 64 which is attached to cylinder 92. Shaft 86 is supported by bushing 88 and retaining screw 84. Prism 98 is attached to cylinders 90 and 92 by support members 96 and 67, so that prism 98 rotates at the same rate of rotation as main gear 64. Damping spring 66 provides shock absorbance during rapid rotation and roller bearings 62 act as friction reducing support members for cylinders 90 and 92.

Prism 98 is illustrated so that a reflective surface 138 is at a fortyfive degree angle to incident beam 45. Reflective mirror 70 is mounted upon support member 100 at a fortyfive degree angle to the normal of incident beam 45. Consequently, beam 45 is first reflected ninety degrees by prism 98 and then ninety degrees by mirror 70 producing a light ray 11 which is parallel to beam 45. As prism 98 rotates it generates a series of light rays (not shown) that form pattern 10 of FIG. 1. A matte pattern 72 may optionally be utilized to stop transmission of any unwanted light. Matte pattern 72 is coupled by mounting member 76 to support frame 74 which is entirely removable to facilitate interchanging various matte patterns. A polarizing filter 80 can optionally be utilized to polarize laser beam pattern 10 (shown in FIG. 1). This would be desirable in multi-camera situations where a filter (not shown) could block the photographic recording of polarized pattern 10. Filter 80 is mounted within frame 78 which is removable to facilitate changing filters. Ray 11 is projected from the scanning mechanism through an aperture machined in coupling apparatus 82.

The size of pattern 10 (shown in FIG. 1) can be altered by changing the angle of the reflective surface 138 of prism 98 to incident beam 45. A mechanism for altering the inclination of prism 98 about pivot pin 68 is provided by support member 96 linking prism 98 to inner cylinder 90. Cylinder 90 is mounted within cylinder 92 so as to provide for the controlled reciprocal vertical movement of cylinder 90 within cylinder 92. This vertical movement is governed by vernier micrometer 56 which is mounted to cylinder 90 by ball bearing housing 59, retaining clip 60, and ball bearing 58. Bearing 58 provides a friction free mount that enables vertical adjustment of cylinder 90 during cylindrical rotation of cylinder 90 and 92. Retaining pin 94 within guide slot 136 facilitates vertical movement of cylinder 90 while maintaining the positioning of cylinder 90 relative to cylinder 92 during rotation.

Micrometer 56 governs the vertical movement of cylinder 90 which controls the positioning of prism 98. In turn, the positioning of prism 98 determines the angle of incidence of beam 45 to the reflective surface 138 and, consequently, the angle of reflection of beam 45 from surface 138. Mirror 70 is at a fixed angle; therefore, it is the variable angle of reflection governed by micrometer 56 that determines the overall variance in the size of pattern 10 (shown in FIG. 1); however, it does not affect the width to height aspect ratio of rectangular pattern 10. The aspect ratio of pattern 10 can be affected by the positioning of micrometers 61 and 57 which govern the linear physical positioning of mirror mounts 100 and 101. The adjustment of all three micrometers produces a wide range of rectangular patterns varying in size and aspect ratio.

Figure 6:
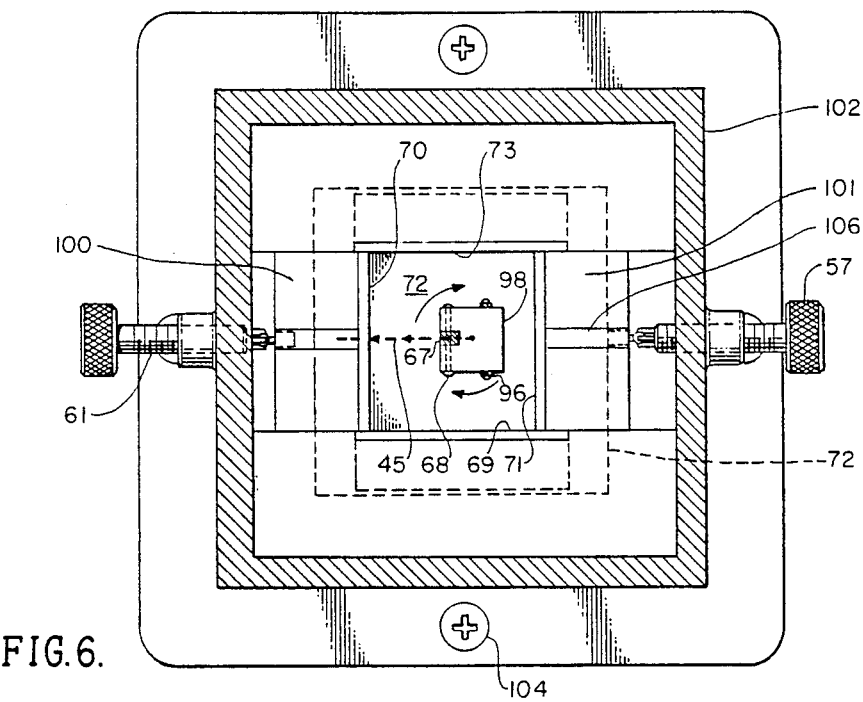
FIG. 6 is a plan view of a cross-section of FIG. 5.

FIG. 6 shows a crossectional plan view of FIG. 5. Rotating prism 98 is shown scanning beam 45 across the surface of mirror 70, mirror 73, mirror 71, and mirror 69. Mirror housing 102 provides support for micrometer 57 which governs the linear positioning of mirror support member 101 along guide ridge 106. Micrometer 61 governs the linear positioning of mirror support 100 in an identical manner. Mirror 73 and mirror 69 are permanently bonded to mirror housing 102 in a static position and are not capable of movement. Screws 104 located in the bottom flange of housing 102 couple filter housing 103 of FIG. 5 which contains matte 72 with apertured coupling member 82 of FIG. 5. Although a rectangular shape is illustrated for matte filter 72, other patterns may be employed.

Figure 7:
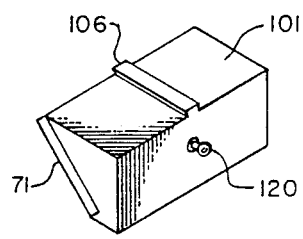
FIG. 7 is a perspective drawing of a part shown in FIG. 6.

FIG. 7 shows a perspective drawing of mirror 71 affixed to mirror mount 101. Guide track 106 is shown on the top surface of mount 101 and coupling knob 120 which couples micrometer 57 of FIG. 6 to mirror mount 101 is shown on the back surface of mirror mount 101.

Figure 8:
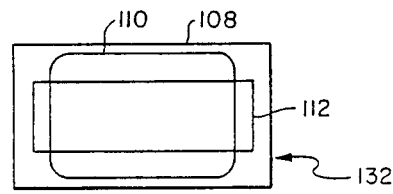
FIG. 8 is a schematic drawing of patterns generated by the invention.

FIG. 8 shows four diagrams representing possible permutations of pattern 10 of FIG. 1. These diagrams (not to scale) represent standard optical frame aspect ratios recommended by the American National Standards Institute. Diagram 108 is a rectangle that represents the recommended standard full aperture frame with a width to height aspect ratio of 1.37:1. Diagram 110 represents the television broadcast safe action area with a width to height aspect ratio of 1.33:1. Diagram 112 represents the most common optical frame format used in 35 mm motion picture photography and corresponds to a rectangle with a width to height aspect ratio of 1.85:1:1. Diagram 132 is the composite image of the aforementioned diagrams 110, 108, and 112. The superimposition of these three images is commonly found etched onto the ground glass 144 of FIG. 3 to help align the photographic object with the field of view of the camera 134 shown in FIG. 3. Scanner 44 (shown in FIG. 5) is capable of generating and projecting diagram 108 and diagram 112 as well as a rectangle approximating the pattern of diagram 110; however, to exactly replicate the rounded corners of diagram 110, the scanning device 44 (shown in FIG. 1) would have to utilize technology shown in FIG. 12 combined with a matte pattern having the specific shape of diagram 110. To replicate the superimposed patterns 132, the scanning device would need to utilize low inertial scanning technology similar to that shown in FIG. 9.

Figure 9:
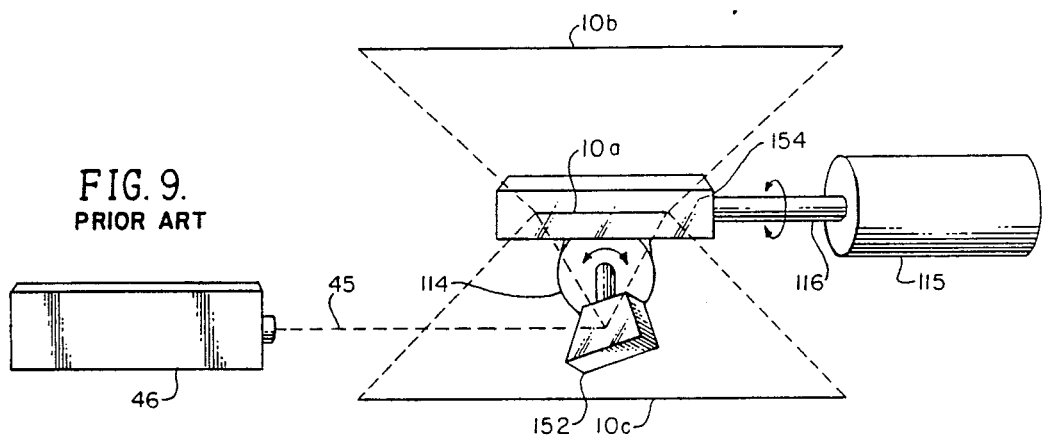
FIG. 9 is a perspective drawing of PRIOR ART.

FIG. 9 shows a prior art illustration of a low inertial scanner that could be utilized with this invention to generate complex patterns. Laser light emitter 46 projects beam 45 to mirror 152. Stepper motor 114 oscillates mirror 152 producing scan line 10a along the surface of mirror 154. Stepper motor 115 oscillates mirror 154 through connecting shaft 116 to produce scanned lines 10b and 10c. When stepper motors 115 and 114 are precisely controlled through digital electronic pulses (not shown) complex patterns can be produced and projected onto the photographic subject matter 13 shown in FIG. 1.

Figures 10, 11:
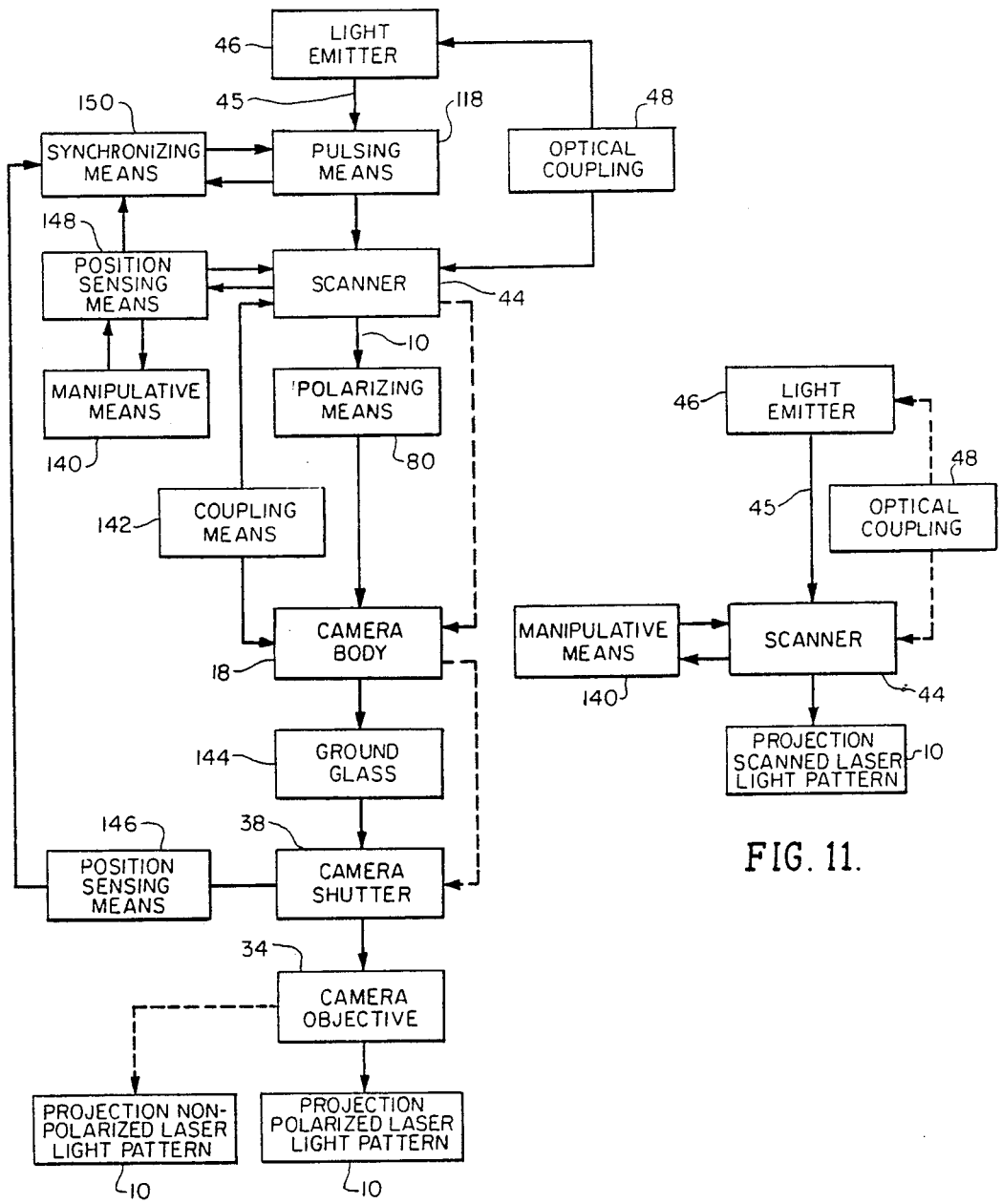
FIG. 10 is a flowchart describing the elements of the laser framefinder when it is used in conjunction with the reflex viewing optics of the camera.
FIG. 11 is a flowchart describing the elements of the invention when it projects a pattern along an optical axis separate from the optical axis of the camera.

FIG. 10 shows the interaction of the separate elements of the laser framefinder in a flow chart. Dotted lines indicate optional or alternate embodiments of the invention. The flow chart shows light emitter 46 generating light beam 45. Beam 45 is preferably coherent laser light, but may be other forms of visible and invisible radiation. Beam 45 passes through a pulsing means 118; which is a light valve 200 (shown in FIG. 14) with an electronic switching circuit 198 (shown in FIG. 14) capable of governing the rate of operation of valve 200; such as, a mechanical shutter (not shown) capable of periodically interrupting beam 45. When the pulsing means 118 is open, beam 45 passes directly to scanner 44 or alternately travels through an optical coupling 48 which is, preferably, a fiber-optic cable. Scanner 44 converts beam 45 into pattern 10 and projects pattern 10 through polarising means 80 which is, preferably, a glass polarizing filter. Pattern 10 may optionally remain non-polarized; however, in either case pattern 10 is projected directly into the camera body 18. In this embodiment scanner 44 is directly connected to the camera body 18 by coupling means 142. Coupling means 142 utilizes, preferably, a threaded aperture hole (not shown) cut into camera body 18 interfacing scanner 44 with camera 18; thereby, arranging the alignment of pattern 10 with the reflex optical pathway represented by: the ground glass 144, the camera shutter 38, and the camera objective 34. Ground glass 144 is a substantially planar optical element positioned at the focal plane of objective 34 that, in this embodiment, is transparent to polarized laser light 10, yet translucent to other forms of visible light. Preferably, this is acheived by cholesteric-isotropic phase transition in a thermally activated liquid crystal material. In some cases additional optical elements (not shown) are essential to transmit a bundle of light rays along a path other than a straight line. For instance a prism 98 (shown in FIG. 5) might be disposed between beamsplitting cube 42 of FIG. 2 and ground glass 144 in order to conduct the beam 45 through a 90 degree angle.

Commonly, the ground glass 144 is removable from its holder 145 (shown in FIG. 3) allowing an alternate embodiment of the invention which bypasses ground glass 144. Camera shutter 38 is preferably a reflective surface mounted at an angle which aligns pattern 10 with the optical axis of objective 34 and projects pattern 10 through objective 34. In a motion picture camera, shutter 38 is commonly a mechanically rotated disc which is partially transmissive and partially reflective. To ensure that pattern 10 strikes only the reflective portion of shutter 38 a position sensing means 146, which is preferably an electro-magnetic sensor 170 (shown in FIG. 2), electronically signals synchronizing means 150 which controls pulsing means 118. Synchronizing means 150 is an electronic control circuit such as the one discussed in FIG. 14. Certain low inertial and resonance scanners 44 which generate complex patterns (not shown) also require synchronization of the positioning of their optical elements (not shown) with pulsing means 118 through a feedback network comprised of: manipulating means 140, position sensing means 148, synchronizing means 150, and pulsing means 118.

FIG. 11 shows an alternate embodiment of the invention by utilizing a flow chart to show a light emitter 46 generating a beam of light 45 to scanner 44 which directly projects laser light pattern 10. Light emitter 46 is shown directly coupled to scanner 44 or alternately coupled by optical coupling 48 which is, preferably, a fiber-optic cable. Pattern 10 is generated by the optical elements (not shown) of scanner 44 which are controlled by manipulative means 140. Scanner 44 is, preferably, a low inertial or resonance scanner capable of generating complex patterns.

Figure 12:
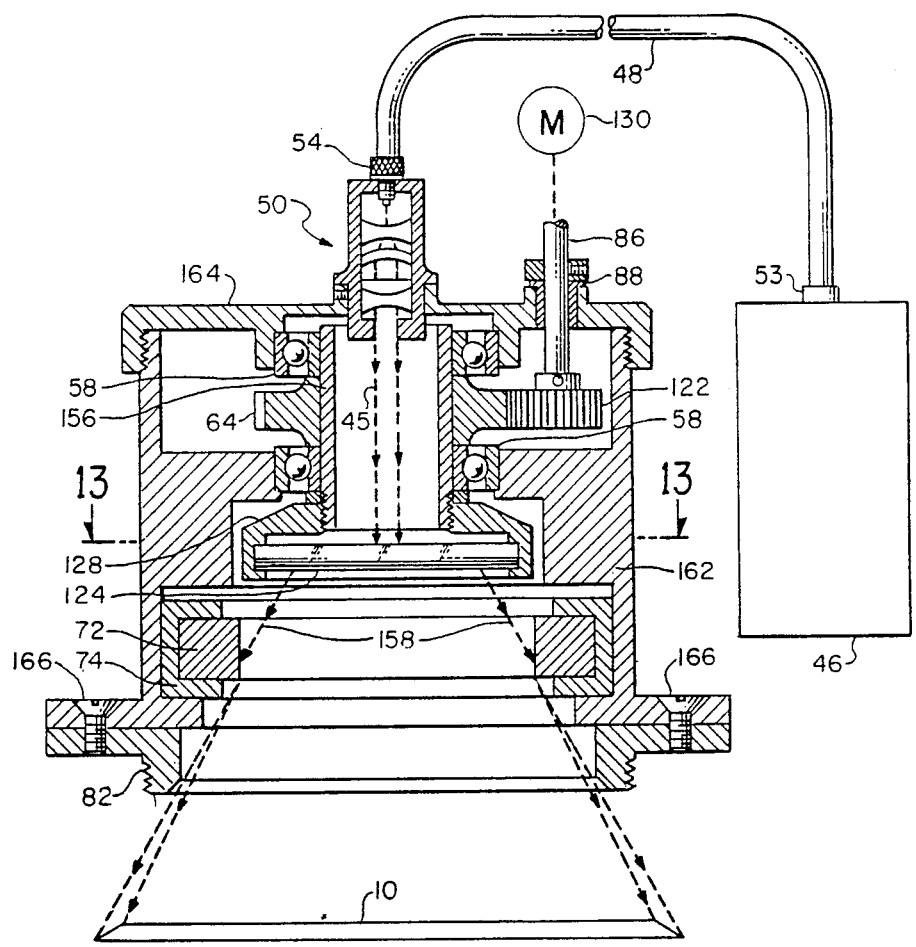
FIG. 12 is an elevation view of an alternate embodiment of the scanning device utilized by the invention.

FIG. 12 shows a crossection of an alternate embodiment of a scanning mechanism utilized to convert a beam 45 into a pattern 10. In this embodiment a laser emitter 46 generates a laser beam 45 which is transmitted by fiber-optic 48 through connector 54 to collimating lens assembly 50. Recollimated beam 45 passes through cylinder 156 to line generating lens 124. Lens 124 refracts beam 45 spreading it into a planar projection of light (not shown) which, when projected onto a flat suface, appears as a line of light (not shown). When line generating lens 124 is rotated the 360 degree rotation of the planar projection of light forms a cone of light 158. Light cone 158 is a conically shaped projection of light having a vertex near to the intersection of light beam 45 with lens 124. Light cone 158 is entirely filled with light. Matte 72 quadrilaterally sections cone 158 forming rectangular pattern 10 which is entirely filled with light. Pattern 10 is projected out of the scanning mechanism through an aperture hole machined in coupling member 82. The structural support housing of the scanning mechanism consists of: a top plate 164, a main support member 162, and apertured coupling member 82. The bottom flange of the main support member is designed to affix apertured coupling member 82 by threaded screws 166. Threaded circular top plate 164 interfaces with threaded member 162 and provides support for collimating lens 50, and drive shaft 86.

The mechanical power to rotate lens 124 is provided by a motor 130 (shown in symbol form by an encircled letter M), which is connected to a drive shaft 86 which rotates drive gear 122. Gear 122 transmits the rotation to main gear 64 which is attached to cylinder 156. Shaft 86 is supported by bushing 88. Line generating lens 124 is mounted in apertured lens retainer 128, so that lens 124 rotates at the same rate of rotation as main gear 64. Bearings 58 act as friction reducing support members for cylinder 156.

Figure 13:
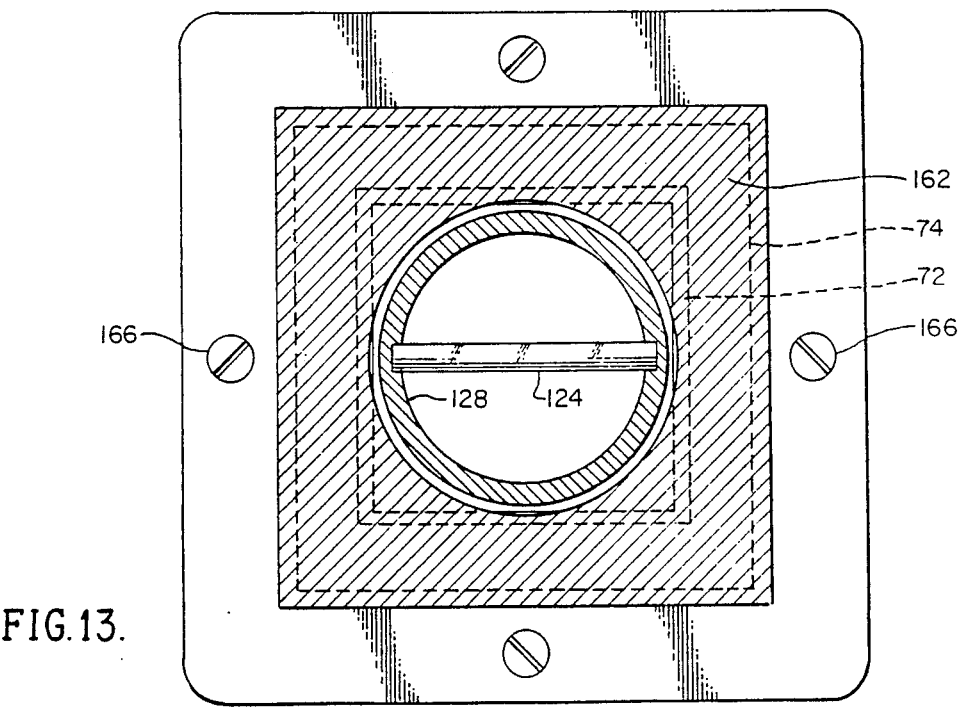
FIG. 13 is a plan view of a cross-section of FIG. 12.

FIG. 13 is a crosssectional view of FIG. 12 showing line generating lens 124 mounted in apertured lens retainer 128. Rectangular matte 72 is shown mounted in matte frame 74 which is mounted in main support member 162. Screw 166 retains apertured coupling member 82 (shown in FIG. 12) to the bottom flange of main support member 162.

FIG. 14 describes with a flow chart the interaction of the separate elements of an electronic feedback network used to pulse the laser emitter 46 (shown in FIG. 1). A first sensor 170 is placed proximate to the optical means 172. Optical means 172 is for aligning pattern 10 (shown in FIG. 3) with the optical axis 168 of FIG. 3. The preferred embodiment is utilizing the reflective surface of a shutter mechanism 38 (shown in FIG. 2) which utilizes mechanical movement to shunt an image into the reflex viewing optical pathway 32 of FIG. 2. First sensor 170 senses the spatial positioning of the optical means 172 and converts the information into digital electronic pulses which are carried by electric wire 182 to electronic bus 188. A second sensor 174 is placed proximate to a first reflective optical element 176, senses its spatial position, converts the information into digital electronic pulses which are carried along wire 184 to buss 188. A third sensor 178 is placed proximate to a second reflective optical element 180, senses its spatial position, converts the information into digital electronic pulses which are carried along wire 186 to buss 188.

The electronic bus relays the digital information carried by wire 182 to a first electronic sensor circuit 190 which transmits the information to a series of logic circuits contained in complimentary metal-oxide-semiconductor integrated circuit 198. Similarly, the buss 188 relays the information carried in wire 184 to second sensor circuit 192 which transmits the information to a second integrated circuit 196. Bus 188 also relays the information carried in wire 186 to a third sensor circuit 194 which transmits the information from the third sensor 178 to the second integrated circuit 196. Integrated circuit 196 serves several purposes. It processes the positional information provided by sensors 174 and 178 and logically integrates it with control data sent from a third integrated circuit 202. By sending the integrated data through a series of logic gates contained within integrated circuit 196 it controls electronic pulses sent to a first oscillating means 204 and a second oscillating means 206. In turn, the first oscillating means 204 controls the mechanical movement of a first reflective optical element 176 and the second oscillating means 206 controls the mechanical movement of a second optical element 180.

Optical elements 176 and 180 are used to scan beam 45 into pattern 10 (shown in FIG. 1). Sensors 174 and 178 determine the new spatial position of optical elements 176 and 180 caused by the oscillating means 204 and 206 and feedback the information to second integrated circuit 196 completing the feedback network loop. The second integrated circuit 196 also determines when the optical elements 176 and 180 are both in a correct position and informs the first integrated circuit 198 which integrates the information with data from sensor 170 and determines whether to send an electronic control pulse to regulating means 199. If the optical means 172 is in the correct position at the same time that optical elements 176 and 180 are in correct positions, then a control pulse is sent to regulating means 199. Regulating means 199 directly controls the mechanical operation of light valve 200 and acts as a feedback sensor which determines the position of light valve 200 and sends that information back to the electronic switching circuit 198.

Manipulating means 140 controls integrated circuit 202 by electronic signal and preferably contains integrated circuits capable of electronically storing the data needed to generate specific configurations of light pattern 10 (shown in FIG. 1). Manipulating means 140 also contains manual controls for altering the mechanical movement of optical elements 176 and 180. In alternate embodiments utilizing the various scanners of FIG. 5, FIG. 9, and FIG. 12 right angle prism 98 (shown in FIG. 5), mirrors 152 and 154 (shown in FIG. 9), and line generating lens 124 (shown in FIG. 12) ar substituted for optical elements 176 and 180.

Through this feedback network employing multiple sensors a synchronizing control unit (not indicated) comprised of: bus 188; sensor circuits 190, 192, and 194; and integrated circuits 196, 198, and 202 controls an electronic means of synchronizing: the positions of optical elements 176 and 180, the position of optical means 172, and the means of regulating 199 light valve 200 which pulses the beam of laser light 45 from laser emitter 46.

Figure 15:
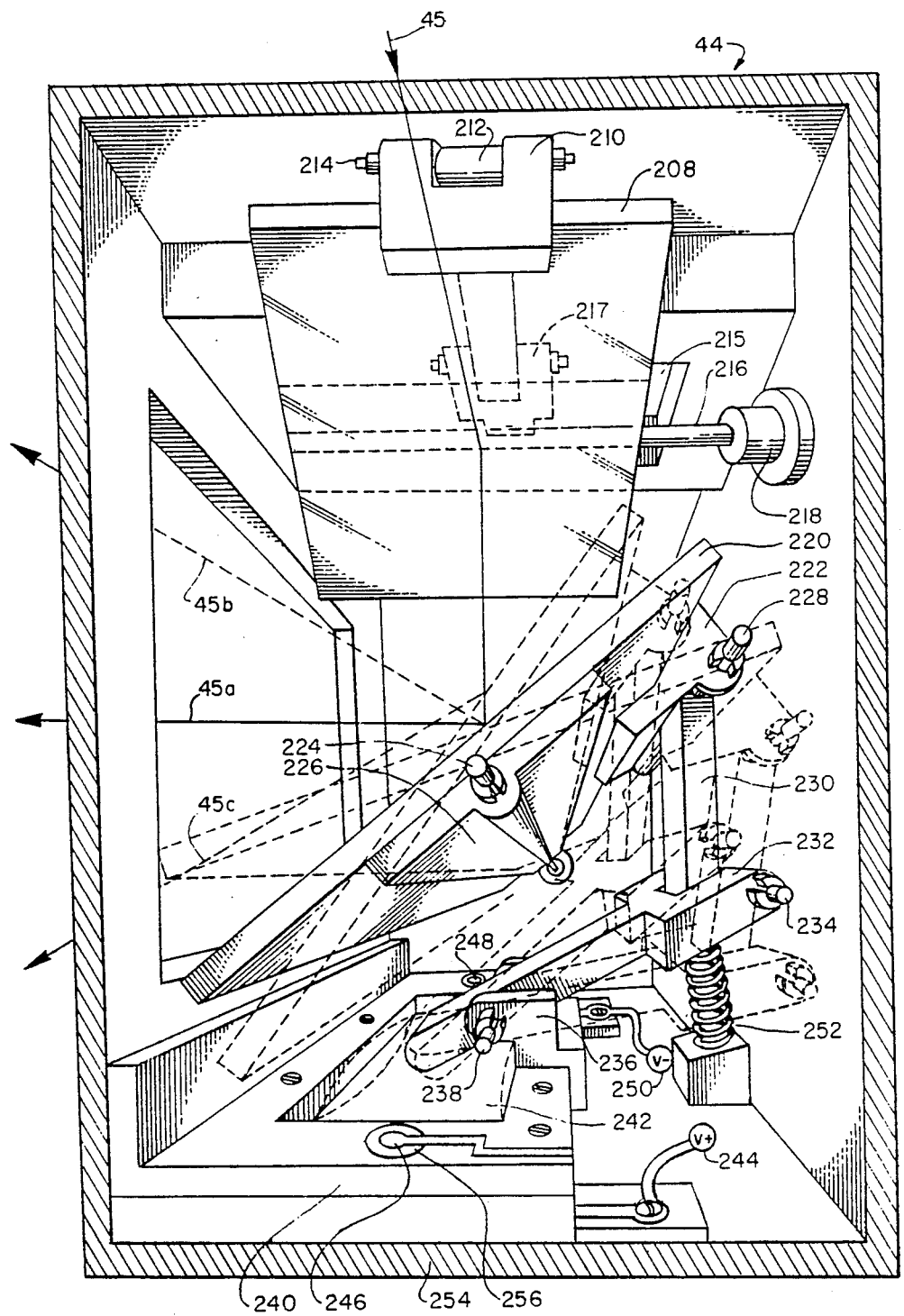
FIG. 15 is a perspective drawing of a two coordinate laser scanning device which has mirrors oscillated by piezo-electric crystals.

FIG. 15 shows a hollow structure 254 enclosing a first mirror 208 and a second mirror 220. Mirror 208 is oriented to reflect incident beam 45 onto mirror 220 which reflects beam 45 through an aperture in hollow structure 254. Mirror 208 and mirror 220 are mechanically configured to independently oscillate. The oscillation of mirror 208 produces a scanned line (not shown) across the surface of mirror 220. The independent oscillation of mirror 220 subsequently projects a pattern. Depending upon the relative speed of the two independent rates of oscillation a large variety of patterns can be projected. The physical means for inducing the oscillation is provided by the phenomenon of the piezo-electric effect, whereby a di-electric crystal 242 reacts to an applied voltage 244. Piezo-electric crystals can be made to oscillate at different rates by varying the voltage applied across them; therefore, the electrical control circuits 196, 198, and 202 of FIG. 14 could effectively generate a large number of complex patterns using this type of scanning mechanism. The mechanical components consist of a mirror 220 attached to a backing 226 which centers mirror 220 about a supporting rod 224 around which the mirror pivots in an oscillatory manner. Mirror 220 is gripped along one edge by slotted plate 222 which is joined to an elongated linkage arm 230 by dowel pin 228. Linkage arm 230 is connected to levered arm 232 by dowel pin 234. Fulcrum support 236 allows lever arm 232 to pivot about fulcrum dowel pin 238. Lever arm 232 rests on a di-electric crystal 242 which is suspended in the cavity of retaining member 240. A voltage drop across the crystal 242 is achieved by coupling wire 244 to a voltage source such as integrated circuit 198 of FIG. 14 and by attaching wire 250 to complete the electric ciruit. A current flows from wire 244 through electrical circuit 246 where it passes down to crystal 242 through conducting post 256. The current flows through crystal 242 to electrical circuit 248 which passes it to wire 250 which goes to an electrical ground or to another electrical component (not shown).

As the current passes through crystal 242 it causes the crystal to rise and fall within the cavity of retaining member 240. As it oscillates, crystal 242 mechanically affects lever arm 232 slightly moving it up or down. Through the fulcrum effect of dowel pin 238 the slight movement is amplified by lever arm 232 and transmitted through linkage arm 230 and gripping plate 222 to mirror 220. The amplified movement is sufficient to pivot mirror 220 about support rod 224 so that it reflects incident beam 45 along the path of beam 45a, beam 45b, and beam 45c.

In this embodiment the contact between the crystal 242 and the lever arm 232 is maintained by a positive pressure exerted by spring 252. In an alternate embodiment (not shown) lever arm 232 would be directly affixed by adhesive or fastening means to crystal 242.

The mechanical configuration of the two mirrors 208 and 220 are identical except for their spatial orientation within enclosure 254. Mirror 208 is gripped along one edge by a slotted plate 210 which is connected by dowel pin 214 to linkage arm 212. The linkage 212 is connected as before to a levered arm 217 which is connected to a di-electric crystal 215. The mirror is mounted around a central support shaft 216 which is anchored to the enclosure 254 by cylindrical support member 218.

RAMIFICATIONS AND SCOPE

Accordingly, the reader will see that this device optically projects a reference pattern or multiple patterns of light that correspond to an optical frame or to subject matter within an optical frame of a camera. The reference pattern is projected in three dimensional space onto subject matter within a field of view of a camera; consequently, the invention obviates the need to refer to a viewing system of a camera to ascertain an optical frame. A film worker using the Laser Framefinder can closely monitor the subject matter included in an optical frame as well as monitoring changes in the field of view due to camera movement. Furthermore, the Laser Framefinder has additional advantages, in that:

atmospheric particles can cause the boundary of an optical frame to become apparent in three dimensional space allowing film workers to anticipate a subject moving into or exiting from the optical frame;

the photographer can indicate specific items by using the laser beam as a pointer, enabling him to discuss problems that may be physically far removed or difficult to point out to an individual not viewing along the same optical axis. For instance, the application of dulling spray on a shiny object far removed from the camera;

the dolly or crane operator can more easily coordinate the movements of the dolly or crane with the movements of the camera by simply watching the pattern of light projected from the camera;

an individual responsible for special effects, such as explosions or bullet hits, can more effectively time pyrotechnic effects so that they occur while within the optical frame;

actors cognizant of the optical frame can: enter or exit the frame on cue, avoid accidentally slipping out of the optical frame, and avoid moving so fast that the camera operator cannot follow the action;

matte images that are to be optically composited can be indicated with a laser pattern so that actors have a point of reference to play against and the correct eyeline to match the action of the final composite;

the laser pattern can be projected onto the subject matter being photographically recorded without the danger of the laser pattern being recorded as well due to synchronizing the pulsation of the laser with the moment of the shutter mirror;

the Laser Framefinder can be utilized during rehearsals as well as during actual photography allowing the technical crew to rehearse in precise coordination with the talent, models, moving objects or even puppets. The Laser Framefinder obviates the need to verbally discuss the physical location of the optical frame; therefore, discussion of mistakes after a rehearsal will produce highly efficient corrective action, saving film as well as saving time, and result in decreased costs; and an individual physically located near the action being filmed, yet remote to the camera, would have to travel back to the camera and reference the viewfinder to pinpoint the location of the optical frame. Utilizing the Laser Framefinder provides an efficient method for individuals to ascertain the optical frame while remote to a viewing system.

Although the description above contains many specificities, these should not be construed as limiting the scope of the invention, but merely providing illustrations of some of the presently preferred embodiments of this invention. For example, the light emitter could be a multi-mode laser or single mode laser; collimated white light could be used instead of laser light; the optical elements of the scanning device could be oscillated by the levered amplification of crystal oscillations induced by an electric current; a digital information storage system, such as a computer, could be employed to project specific patterns; and the motor drive described could be replaced with hydraulic or pnuematic drive systems.

While particular embodiments of the present invention have been shown and described, it will be obvious to those skilled in the art that changes and modifications may be made without departing from this invention in its broader aspects and therefore, the aim in the appended claims is to cover all such changes and modifications as fall within the true spirit and scope of this invention. Thus, the scope of the invention should be determined by the appended claims and their legal equivalents, rather than by the examples given.

I claim:

1. A photographic apparatus for indicating a field of view of an image recording device comprises the combination of:
   a) a camera
   b) a light emitter having a light source mounted therein for enabling the projection of a beam of light and means for attaching said light emitter to said camera;
   c) a pattern generating means for altering said beam of light attached to the recording apparatus and disposed between said light emitter and said camera so as to generate a light pattern;
   d) means for aligning the projected light pattern with said field of view of said image recording device so as to indicate objects lying within an image recorded by the device;
   whereby said pattern generating means provides a projection of said light pattern along an optical axis independent of the axis of said image recording device; yet aligned with said field of view;
   e) a collimating lens assembly mating with an aperture in said pattern generating means and having means for aligning said beam of light with the pattern generator;
   f) a fiber-optic cable interposed between two connectors thereon for propagating said beam of light along the full length of the fiber and means for attaching a first end of said fiber-optic cable to said light emitter and attaching an opposing second end thereof to said collimating lens.

2. The invention as described in claim 1 wherein said field of view is illuminated by said projection of said light pattern corresponding in dimensional aspect ratio to an optical frame of said image recording device.

3. An image recording apparatus of the type comprising a reflex viewing system, an objective having a field of view, a medium, and means for recording images thereon via said objective; the improvement wherein said image recording apparatus comprises combination of:
   a) a laser light emitter having an optical cavity mounted therein for enabling the projection of a coherent beam of laser light;
   b) a light scanning device attached to said image recording apparatus disposed between said laser light emitter and said image recording apparatus having a reflective optical element mounted therein and means for altering the spatial orientation of said coherent beam of laser light so as to generate a light pattern; and
   c) a beamsplitting element mounted within said reflex viewing system and associated with said light scanning device for receiving said light pattern generated thereby and optical means for coaxially aligning the pattern with the optical axis of said image recording apparatus.

4. The invention of claim 3, further including, in combination:
   a) a collimating lens assembly mating with an aperture in said light scanning device and having means for aligning said coherent beam of laser light with said reflective optical element;
   b) a fiber-optic cable interposed between two connectors thereon for propagating the beam of light along its full length and means for attaching one end of said fiber-optic cable to said laser light emitter and attaching an opposing end thereof to said collimating lens.

5. The laser light emitter of claim 3, further including, in combination:
   a) a light valve attached to said laser light emitter and arranged substantially lying across the optical axis of said coherent beam of laser light so as to interrupt the beam; and
   b) an electronic switching circuit is connected to said light valve providing regulating means for governing the rate of operation of said valve.

6. The invention as described in claim 5, further including, in combination:
   a) a feedback network having a multiplicity of sensors located within said image recording apparatus and within said light scanning device and arranged proximate to said reflective optical element and said optical means; providing a means for continuously determining a plurality of spatial positions thereof;
   b) a synchronizing control unit is attached adjacent to said regulating means having a plurality of electronic circuits associated with said sensors and means for transmitting said spatial positions from said sensors to said synchronizing control unit via the circuits; and
   c) an electronic means for sychronizing said regulating means with the spatial position of said optical means and said reflective optical element;
   whereby, a pulsation of said coherent beam of laser light is synchronized with a multiplicity of positions of said reflective optical element to form various light patterns and synchronized with said optical means to insure alignment of said light pattern with the optical axis of said image recording apparatus so as to project the patterns upon photographic subject matter located within said field of view of said image recording apparatus.

7. The invention of claim 3, further including, in combination:
   a) a ground glass having a substantially planar member lying at a focal plane of said objective and arranged along the optical axis of said reflex viewing system;
   b) a holder located within the reflex viewing system surrounding and encasing the perimeter of said ground glass; and
   c) optical means for providing transparency in said ground glass to said coherent beam of laser light.

8. The invention as described in claim 3 wherein said field of view is illuminated by said light pattern generated from said light scanning device and projected by said objective of said image recording apparatus so as to correspond in dimensional width to height aspect ratio to an optical frame of the recording device.

9. The invention as described in claim 8 wherein said light pattern comprises combination of:
   a) a first rectangular projection having a 1.37:1 dimensional width to height aspect ratio generated by said light scanning device so as to correspond with the aspect ratio of a common motion picture full aperture frame and to project a representation of the full frame upon a photographic object;
   b) a second approximately rectangular projection having a 1.33:1 dimensional width to height aspect ratio generated by said light scanning device so as to correspond with the aspect ratio of a common television broadcast optical frame and to project a representation of the broadcast frame upon said photographic object;
   c) a third rectangular projection having a 1.85:1 dimensional width to height aspect ratio generated by said light scanning device so as to correspond with the aspect ratio of a common motion picture optical frame and to project a representation of the frame upon said photographic object;
   d) means for superimpositionally projecting three optical frames: the full aperture frame, the television broadcast frame, and said common motion picture optical frame, from said image recording apparatus to the photographic object thereof and symmetrically arranged about the optical axis of said objective;
   whereby, an observer could visually ascertain the spatial relationships of the superimpositionally projected frames.

10. A photographic apparatus for indicating an area to be recorded by a camera comprising the combination of:
   a) an image comprising a plurality of photographic objects;
   b) a plurality of optical frames comprising a selected area of said image;
   c) a camera in spaced relationship to each of said plurality of photographic objects and having means for recording said image;
   d) a light emitter comprising means for projecting a beam of light;
   e) a light scanning device comprising optical means for scanning said beam of light; and further including an optical element mounted within the scanning device;
   f) a fastening means for coupling said light scanning device to said camera so as to align said beam of light with beam splitting means carried within the recording apparatus arranged substantially lying along the optical axis of a reflex viewing means;
   g) optically transmissive means for coupling said light emitter with said light scanning device arranged between the emitter and the scanner so as to align said beam of light with said optical element;
   h) manipulating means for oscillating said optical means adjacent thereof and arranged so as to alter a spatial orientation of said beam of light;
   i) such that a light pattern is formed by said manipulating means interacting with said optical means thereby governing the action of the scanning means so as to cause a sequential alteration of the orientation of the beam; and
   j) an optical projecting means for coaxially aligning said light pattern with said camera's optical axis; said optical projection means carried within said camera and arranged lying along the optical axis of said camera and between an objective and a focal plane thereof so as to project said light pattern upon said plurality of photographic objects;
   whereby, an observer could visually ascertain said optical frames without reference to a viewing system of said camera by visually perceiving the pattern projected from said camera upon said plurality of photographic objects.

11. The camera of claim 10 wherein said means for recording is a body surrounding and encasing a photoresponsive emulsion affixed upon a base film located therein at said focal plane of said objective attached to said body.

12. The camera of claim 10 wherein said means for recording is a body surrounding and encasing a plurality of sensors photoresponsive to radiation of the visible electro-magnetic spectrum located therein at said focal plane of said objective attached thereto.

13. The invention as described in claim 10 wherein said light emitter comprises a combination of:
   a) an apertured body having an optical cavity mounted therein for enabling the projection of a coherent beam of laser light;
   b) a light valve attached to said apertured body arranged substantially lying across the optical axis of said coherent beam of laser light so as to interrupt the beam; and
   c) an electronic switching circuit connected to said light valve having regulating means for governing the rate of operation of the valve.

14. The invention as defined in claim 13, further including, in combination:
   a) a feedback network having a multiplicity of sensors located within said camera and within said scanner and arranged in proximity to: said optical projecting means, said optical element, and said optical means providing a means for continuously determining a plurality of spatial positions thereof;
   b) a synchronizing control unit attached adjacent to said regulating means having a plurality of electronic circuits associated with the sensors and means for transmitting an electrical signal indicating the spatial positions from said sensors to said synchronizing control unit; and
   c) an electronic means for sychronizing said regulating means with the spatial position of three items: said optical projecting means, said optical element, and said optical means;
whereby, a pulsation of said coherent beam of laser light synchronized with a multiplicity of positions of said optical element to form various light patterns and synchronized with said optical projecting means to insure alignment of said light pattern with the optical axis of said camera.

15. The invention as defined in claim 13, further including, in combination:
   a) a multiplicity of filters;
   b) a selected one of said multiplicity of filters located within said light scanning device and arranged substantially lying across the optical axis of said beam of light;
   c) a filter holder surrounding and encasing the filter and means for interchanging said filters therein;
   d) a first filter of said multiplicity of filters having means for polarizing said coherent beam of laser light;
   e) a second filter of said multiplicity of filters having means for varying the optical power output of the beam; and
   f) a third filter of said multiplicity of filters having means for determining the color of said coherent beam of laser light.

16. The light scanning device of claim 10 wherein said optical means comprises the combination of:
   a) an apertured enclosing body having a cavity in which two mirrors are arranged, a first mirror associated with said beam of light incident thereto and a second mirror associated with said first mirror for receiving the beam reflected therefrom;
   b) said first mirror having a substantially planar member arranged lying across the optical axis of said beam of light;
   c) said second mirror having planar element arranged lying across the optical axis of the beam reflected from said first mirror;
   d) a two coordinate system of points superimposed upon a perpendicular plane section of the projected pattern;
   e) a first oscillating means for scanning said beam of light attached to said first mirror so as to generate a primary scan line across a reflective surface of said second mirror resulting in a reflected scan line oriented along one axis of said two coordinate system of points;
   f) a second oscillating means for scanning the reflected beam incident upon said second mirror attached thereto so as to generate a secondary scan line oriented along the other axis of said two coordinate system of points; and
   g) an electrical cable is interposed between the two oscillating means and a distally associated electronic means for governing the spatial positioning of said first mirror and said second mirror;
whereby, the alignment of said beam of light with any point lying within the two coordinate system is facilitated.

17. The light scanning device of claim 16 wherein said oscillating means comprises the combination of:
   a) a first di-electric crystal;
   b) a second di-electric crystal;
   c) a piezoelectric means is attached to each of said first di-electric crystal and said second di-electric crystal so as to independently generate an oscillation therein; and
   d) a levered means comprised of a plurality of elongated support members is interposed between said first di-electric crystal and said first mirror and between said second di-electric crystal and said second mirror so as to independently amplify and transmit said oscillation from each of the crystals to the associated mirror.

18. The invention as described in claim 16 wherein said oscillating means comprises the combination of:
   a) a first stepper motor having a first drive shaft attached to an armature of the motor;
   b) a second stepper motor having a second drive shaft attached to an armature of said second stepper motor; and
   c) means for conveying oscillatory energy from each of the shafts to a selected one of the mirrors associated therewith.

19. The invention as defined in claim 10 wherein said light scanning device comprises the combination of:
   a) a line generating lens having a refractive optical quality characterized by the conversion of said beam of light incident upon the lens into a triangular planar projection of light having a vertex near said line generating lens;
   b) a rotatable retaining means for holding said line generating lens perpendicular to the incident beam so as to align the light beam with the lens at a mesial point of intersection;
   c) means for conveying rotational energy to said rotatable retaining means so as to produce a conical shaped projection of light having a common vertex with said triangular planar projection of light;
   d) a substantially planar holder surrounding and encasing a matte pattern is located within a slot positioned near the underside of the scanning device and arranged so that the holder is removable from said slot; and e) said matte holder having said matte pattern mounted therein for blocking a portion of said conical shaped projection of light arranged lying along the path of the light cone so as to alter the shape of the light projection.

20. The invention as defined in claim 10 wherein said light scanning device comprises the combination of:

a) said optical element which is a right angle optical prism arranged lying along the optical axis of said beam of light so as to cause an angled reflection of the incident light beam;

b) a first cylinder coaxially aligned within a second cylinder arranged to provide for the controlled reciprocal movement of said first cylinder within said second cylinder and coupled to said prism by a plurality of elongated support members;

c) a mirror housing arranged rectangularly about said prism having a cavity resembling a four sided truncated equilateral pyramid with substantially planar sides comprised of a first mirror and a second mirror symmetrically opposed thereto in a fixed position upon opposing walls of said cavity arranged at a 45 degree angle to the normal of the incident beam and characterized by a reflective surface, and also having a moveable third side and a moveable fourth side with opposed substantially planar reflective surfaces arranged at a 45 degree angle to the normal of the incident beam, said mirror housing arranged so that the common vertex of the walls of said cavity equilaterally bisected by said beam of light;

d) means for laterally moving said third side and said fourth side;

e) mechanical mean for altering the angular inclination of a reflecting surface of the prism so as to alter the angle of reflection of said beam of light incident upon said right angle prism;

f) motorized means for rotating said right angle prism at a constantly variable velocity; and g) a means for controllably transmitting a rotational energy from said motorized means to said right prism so as to scan said beam of light across said mirrored surfaces;

whereby, said beam of light first striking said rotating prism is scanned along the surface of said mirror housing projecting a substantially rectangular light pattern.

21. The invention described in claim 10, wherein said reflex viewing means comprises: a reflex viewing optical pathway incorporated within said camera having a plurality of optical elements mounted therein.

22. The invention as described in claim 21 wherein said reflex viewing optical pathway comprises the combination of:

a) said objective having an optical axis coaxially oriented with the optical axis of said camera;

b) a shutter arranged substantially lying along the optical axis of said camera and interposed between said objective and said focal plane thereof having a substantially planar member at least a portion of which is characterized by a reflective surface and arranged so that said reflective surface coaxially aligns said beam of light with the axis of said objective;

c) a ground glass having a translucent planar element lying at said focal plane of said objective and arranged along the optical axis of said reflex viewing optical pathway characterized by optical transparency to a polarized beam of laser light; and d) a body surrounding and encasing said shutter and said ground glass and attached to said objective.

23. The invention as described in claim 22, further including: a prism disposed between said beamsplitting means and said ground glass for conducting said beam thereto.

24. The invention as described in claim 10 wherein said light pattern is generated and projected having a dimensional width to height aspect ratio of 1.85:1, so as to correspond with the aspect ratio of a common motion picture optical frame and to project a representation of the frame upon said plurality of photographic objects.

25. The invention as described in claim 10 wherein said light pattern is generated and projected having a dimensional width to height aspect ratio of 1.33:1, so as to correspond with the aspect ratio of a common television broadcast optical frame and to project a representation of the broadcast frame upon said plurality of photographic objects.

26. The invention as described in claim 10 wherein said light pattern generated and projected having a dimensional width to height aspect ratio of 1.37:1, so as to correspond with the aspect ratio of a common motion picture full aperture frame and to project a representation of the full frame upon said plurality of photographic objects.

27. The invention as described in claim 10 wherein said light pattern comprises the combination of:

a) a first rectangular projection having a 1.37:1 dimensional width to height aspect ratio generated by said light scanning device so as to correspond with the aspect ratio of a common motion picture full aperture frame and to project a representation of the full frame upon said plurality of photographic objects;

b) a second approximately rectangular projection having a 1.33:1 dimensional width to height aspect ratio generated by said light scanning device so as to correspond with the aspect ratio of a common television broadcast optical frame and to project a representation of the broadcast frame upon said plurality of photographic objects;

c) a third rectangular projection having a 1.85:1 dimensional width to height aspect ratio generated by said light scanning device so as to correspond with the aspect ratio of a common motion picture optical frame and to project a representation of the frame upon said plurality of photographic objects; and d) means for superimpositionally projecting three optical frames: the full aperture frame, the television broadcast frame, and said common motion picture optical frame, from said camera to the photographic object thereof and symmetrically arranged about the optical axis of said objective;

whereby, an observer could visually ascertain the spatial relationships of the superimpositionally projected frames.

28. The invention as described in claim 10 wherein said optically transmissive means comprises the combination of:

a) a collimating lens assembly mating with an aperture mesially located upon the upper surface of said light scanning device and having means for aligning said beam of light with said optical element; and b) a fiber-optic cable interposed between two connectors thereon for propagating said beam of light along the full length of the fiber and means for attaching a first end of said fiber-optic cable to said light emitter and attaching an opposing second end thereof to said collimating lens.

29. A photographic apparatus for indicating a field of view of an image recording device comprises the combination of:

a) a camera;

b) a light emitter having a light source mounted therein for enabling the projection of a beam of light and means for attaching said light emitter to said camera;

c) a pattern generating means for altering said beam of light attached to the recording apparatus and disposed between said light emitter and said camera so as to generate a light pattern;

d) means for aligning said projected light pattern with said field of view of said image recording device so as to indicate objects lying within an image recorded by said device;

whereby said pattern generating means provides a projection of said light pattern along an optical axis independent of the axis of said image recording device; yet aligned with said field of view; and e) said aligning means includes an optical shutter means reflectively aligning and transmitting said projected light pattern about said field of view.

30. The invention as defined in claim 29 wherein:

said optical shutter means includes a mirror having a reflective surface directly receiving said projected light pattern so as to transmit said projected light pattern about said indicated objects.

31. The invention as defined in claim 30 wherein:

said light emitter is a laser generator producing a laser beam of light.

* * * * *